United States Patent
Caretta et al.

(10) Patent No.: US 6,719,025 B2
(45) Date of Patent: Apr. 13, 2004

(54) DUAL COMPOSITION TREAD BAND FOR TIRE

(75) Inventors: Renato Caretta, Gallarate (IT); Marco Nahmias Nanni, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 134 days.

(21) Appl. No.: 09/881,749

(22) Filed: Jun. 18, 2001

(65) Prior Publication Data

US 2002/0033212 A1 Mar. 21, 2002

Related U.S. Application Data

(63) Continuation of application No. PCT/EP99/10253, filed on Dec. 20, 1999.
(60) Provisional application No. 60/116,598, filed on Jan. 20, 1999.

(30) Foreign Application Priority Data

Dec. 21, 1998 (EP) .............................. 98124194

(51) Int. Cl.⁷ .......................... B29D 30/52; B60C 1/00; B60C 11/03; B60C 111/00
(52) U.S. Cl. ................................ 152/209.5; 152/209.8; 156/110.1
(58) Field of Search .................... 152/209.8, 209.9, 152/209.5; 156/110.1, 123, 128.1; 264/250, 326

(56) References Cited

U.S. PATENT DOCUMENTS

| | | | | |
|---|---|---|---|---|
| 3,217,776 A | | 11/1965 | Ellenrieder et al. ......... 152/210 |
| 3,286,756 A | * | 11/1966 | Ellenrieder et al. | |
| 4,319,620 A | * | 3/1982 | Knill | |
| 4,429,728 A | * | 2/1984 | Ippen et al. | |
| 4,683,928 A | * | 8/1987 | Yahagi | |
| 4,848,429 A | * | 7/1989 | Mezzanotte | |
| 4,913,207 A | | 4/1990 | Harakon et al. ............ 152/209 |
| 5,840,137 A | * | 11/1998 | Futamura | |

FOREIGN PATENT DOCUMENTS

| | | |
|---|---|---|
| DE | 3525394 A1 | 1/1986 |
| DE | 3525394 | 1/1986 |
| EP | 0 071 809 A2 | 2/1983 |
| EP | 0 864 446 A1 | 9/1998 |
| GB | 1 588 575 | 4/1981 |
| GB | 2 178 380 A | 2/1987 |
| JP | 56-146405 | * 11/1981 |
| JP | 11-78428 | * 3/1999 |

* cited by examiner

*Primary Examiner*—Steven D. Maki
(74) *Attorney, Agent, or Firm*—Finnegan, Henderson, Farabow, Garrett & Dunner, L.L.P.

(57) ABSTRACT

A tire for a vehicle includes a radial carcass, a tread band disposed radially outward of the carcass, and a belt structure interposed between the carcass and the tread band. The tread band also includes a first portion of a first elastomeric compound having a first modulus of elasticity between about 12 MPa and 16 MPa, measured at 23° C., and a second portion of a second elastomeric compound having a second modulus of elasticity between about 7 MPa and 11 MPa, measured at 23° C. Additionally, a first tread pattern formed on the first portion is different from a second tread pattern formed on the second portion. A related tread band, method for making an asymmetrical tire, and wheel for a vehicle are also disclosed.

15 Claims, 2 Drawing Sheets

DUAL COMPOSITION TREAD BAND FOR TIRE

CROSS-REFERENCES TO RELATED APPLICATIONS

This application is a continuation of International Patent Application No. PCT/EP99/10253, filed Dec. 20, 1999, in the European Patent Office; additionally, Applicants claim the right of priority under 35 U.S.C. §119(a)–(d) based on patent application No. 98124194.6, filed Dec. 21, 1998, in the European Patent Office; further, Applicants claim the benefit under 35 U.S.C. §119(e) based on prior-filed, copending provisional application No. 60/116,598, filed Jan. 20, 1999, in the U.S. Patent and Trademark Office; the contents of all of which are relied upon and incorporated herein by reference.

BACKGROUND OF THE INVENTION

1. Field of the Invention

The present invention relates to a tread band for tires which improves the comfort and handling characteristics of the tire, and more particularly to a tread band for improving the handling and comfort characteristics of a tire with an asymmetrical tread design.

2. Description of Related Art

Tires provide the connection between a vehicle and the road upon which the vehicle travels, and are designed to transfer to the road as much as possible, the acceleration, braking, and directional forces that are generated by the vehicle. These forces act on the road by the friction existing between the elastomeric compound of the tire and the rough surface of the road. To obtain good handling characteristics, the friction between the tire and the road must be maximized by a well-designed tire under a variety of driving conditions, for example when operating over dry, wet, snowy and icy surfaces. In addition, a tire should also provide other functional features, such as a comfortable and smooth ride, and long mileage life. These characteristics should also be maintained when the tire is used under unusual operating conditions, such as when the tire is driven at excessive speeds, over less than ideal road surfaces, or when the ambient temperature reaches high or low extremes.

The performance properties of the tire depend on several characteristics of the tire construction. One of the mechanical characteristics of a tire is the tread pattern provided on its tread band. The tread pattern consists of a series of grooves criss-crossing the tread band both circumferentially and transversely, defining discrete solid blocks and ribs in the tread band. These blocks and ribs are arranged to form a specific pattern. This pattern is varied depending on the expected use of the tire and, for example, may be optimized for handling on dry roads, on wet roads, or in snow and icy conditions.

The tread pattern may be characterized by its net to gross ratio, which is a measure of what proportion of the surface of the tread is actually in contact with the ground. The net to gross ratio is derived by dividing the area of the blocks between the tread edges in actual contact with the ground (the net contact area) by the total surface of blocks and grooves between the tread edges (the gross area). The greater the net to gross ratio, the more rubber is in contact with the ground, for similar tires of equal tread width.

Several general types of tread patterns are commonly known and used for tires. A symmetrical tread pattern is the most common and has a design that appears the same regardless of the direction from which an observer looks at the tire. This type of tire, with a symmetrical tread band, can be mounted on either side of the vehicle and is suitable for rotation in either direction. Asymmetrical tires are also becoming more common. A tire is defined as asymmetrical when it has a tread band divided in two portions by a plane perpendicular to the tire axis of rotation. Each tread band portion has a different design, optimized for a specific purpose. For example, the tread band portion closest to the vehicle can be optimized for wet surface handling, while the other portion can be optimized for cornering. An asymmetrical tire must be mounted in a specific orientation, with one predetermined tread band portion always mounted nearest to the vehicle. Finally, tires with directional tread bands can also be used. A tread band is directional when the tread pattern is specular with respect to the equatorial plane of the tire, and the tire is designed to be mounted in a preferred directional rotation relative to the vehicle.

The tread pattern itself can also be optimized for different operating requirements. For example, the tread pattern can be designed to better resist wear and to provide better handling in dry conditions, or can be designed to be more resistant to hydroplaning and to provide better traction on wet or snowy surfaces. The design of the tread pattern also has an effect on the comfort and smoothness of the ride of the tire. The tread pattern can help maintain directional stability of the tire, and promote smooth and quiet rolling contact of the tire with the road.

It is a difficult task to combine good handling capability with good resistance to wear of the tire, both in the presence of normal tire operating temperatures, which range between 30° C. and 70° C., and high operating temperatures, which can be more than 70° C., and may even surpass 100° C. in some cases. High tire operating temperatures are caused by the thermo-mechanical stresses produced within the tire, especially when driving at high speed and on curvy roads, and tend to reduce the life of the tire. At low temperatures, the elastomeric compounds of the tire tend to wear less, but also provide less friction with the road and, thus, reduced handling performance. At higher temperatures, performances are increased but resistance to wear is degraded.

It is also necessary for the tire to provide the vehicle with a smooth and comfortable ride. Tires that are optimized for good handling tend to be made from stiffer compounds, which often give a harsher and less comfortable ride than softer, more pliable compounds. This can be a problem especially on long trips, because a harsh ride can contribute to driver fatigue.

The conflicting requirements for tire designs of simultaneously providing good handling capabilities, a comfortable and smooth ride, good wear resistance, and low rolling resistance have been difficult to achieve. This has resulted in various compromises in the design of conventional tires. Compromises are made both in the materials used to construct the tire, especially the tread band of the tire, and also in the tread pattern that is formed on the tread band of the tire. The desire to provide good handling properties in all types of weather conditions and temperatures, and to obtain a smooth and comfortable ride have thus required less than ideal selections in both the design of the tread pattern and in the compounds used to form the tread band. Conventionally, attempts have been made to combine different elastomeric compounds in the construction of a tread band to meet the many demands imposed by conflicting requirements for tire performance. For example, British patent 1,588,575 describes a motor vehicle tire having treads capable of providing good traction on roads covered with ice and snow, as well as dry roads. The tire tread of this patent has two separate annular circumferentially extending portions contiguous with each other, and having different configurations from one another, with each made of an elastomeric composition having a second order temperature (also known as glass transition temperature) different from that of the composition forming the other portion.

Another example of a method for reducing the working temperature of a tire tread for vehicles was described in European Patent Application Number EP 864446. In that application, a tire tread was used consisting of a first portion A comprising 100 parts by weight of an elastomeric material, 40–120 parts by weight of a filler comprising from 50 to 100% by weight of carbon black and from 0 to 50% of silica, and 3–40 parts by weight of at least a conventional additive. The tread also had a second portion B comprising 100 parts by weight of an elastomeric material, 40–120 parts by weight of a filler comprising from 30 to 100% by weight of silica and from 0 to 70% of carbon black, and 3–40 parts by weight of at least a conventional additive. In all cases, the silica content in portion B was at least 20% higher than in portion A.

SUMMARY OF THE INVENTION

The Applicant realized that if asymmetrical tread patterns are each formed on a portion of a tread band, and each of the portions of tread band is formed from elastomeric compounds having a different modulus of elasticity (measuring the energy retained and recovered during a cyclic deformation), the resulting synergetic interaction between the tread band compound and the tread pattern provides a tire with improved comfort and smoothness level as well as improved handling characteristics in dry road conditions are achieved.

The improvement in handling and comfort was especially marked when the inner portion of the tread band, towards the vehicle, was formed of a compound having a lower modulus of elasticity, and had a tread design optimized for operating on wet roads. Conversely, the outer portion of the tread band, further from the vehicle, was formed of a higher modulus of elasticity compound, and had a tread design optimized for dry road cornering.

One aspect of the invention is a tire having an asymmetrical tread pattern and providing improved comfort and handling characteristics.

The tire has a radial carcass having two opposing edges; sidewalls extending along the edges of the radial carcass; a tread band disposed radially outward of the carcass; and a belt structure interposed between the carcass and the tread band. When the tire is mounted on a rim that is secured to a vehicle, the inner side of the tire is the side nearest to the vehicle centerline, while the outer side is the side furthest from the vehicle centerline during normal operation. The tread band has a first portion made of elastomeric compound having a first modulus of elasticity, and a second portion made of elastomeric compound having a second, different modulus of elasticity. The first portion of the tread band has a first modulus of elasticity at 23° C. of between 12 MPa and 16 MPa. The second portion of the tread band has a second modulus of elasticity at 23° C. of between 7 MPa and 11 MPa. The first portion also includes a tread pattern that is different from the tread pattern of the second portion.

The two portions of the tread band are circumferential bands that can have a constant width. The first portion is located adjacent to the outer side of the carcass and has a tread pattern optimized for resisting cornering forces when the vehicle is maneuvering, and for providing good handling performance on dry surfaces. The second portion is located adjacent the inner side of the carcass and has a tread pattern optimized for traction in wet and rainy conditions, and for resisting hydroplaning.

The first portion of the tread band has a modulus of elasticity which is greater by at least 1 MPa than the modulus of elasticity of the second portion of the tread band, and more preferably is greater by at least 3 MPa.

In another aspect, the invention is a tread band of a tire for improving the handling and comfort characteristics of the tire. The tread band has a first tread band portion having a first modulus of elasticity and having a first tread pattern a second tread band portion formed of a second elastomeric compound having a second modulus of elasticity, and having a second tread pattern engraved thereon, wherein the first modulus of elasticity is at least 1 MPa greater than the second modulus of elasticity, at 23° C.

The first tread band portion is disposed adjacent to the outer side of the tire.

In yet another aspect of the invention, there is provided a method for improving the handling and comfort characteristics of an asymmetrical tire, including the steps of forming a tire with a first portion of tread band having a first modulus of elasticity, forming a second tread band portion having a second modulus of elasticity, forming on the first portion of tread band a first tread pattern which is optimized for dry roads, and forming on the second portion of the tread band a second tread pattern which is optimized for wet roads.

In a further aspect, the invention is a wheel designed to be mounted on a vehicle, and having a rim and a tire. The tire has an asymmetrical tread band with a first portion made of an elastomeric compound having a first modulus of elasticity and a first tread design, and a second portion made of a compound having a different second modulus of elasticity and second tread design. The modulus of elasticity and the tread pattern of said first portion being more optimized for dry roads and the modulus of elasticity and the tread pattern of said second portion being more optimized for wet roads.

It is to be understood that both the foregoing general description and the following detailed description of the invention are exemplary and explanatory, and are intended to provide further explanation of the invention as claimed.

BRIEF DESCRIPTION OF THE DRAWINGS

The accompanying drawings are included to provide further understanding of the invention and are incorporated in and constitute a part of the specification, illustrate one embodiment of the invention, and together with the description serve to explain the principles of the invention. In the drawings.

DESCRIPTION OF THE PREFERRED EMBODIMENTS

Reference will now be made in detail to the present preferred embodiments of the invention, examples of which are described in the accompanying specification and illustrated in the accompanying drawings.

Tires, according the present invention, having various configurations of tread patterns, have shown that the desired handling performance and comfort, as well as durability and low rolling resistance, can be obtained by using an asymmetrical tread pattern jointly with a tread band divided into two portions, each portion made from an elastomeric compound having a different modulus of elasticity. The two portions of the tread band are in the shape of circumferential bands adjacent one to the other, and separated by a plane perpendicular to the tire rotation axis. The outer tread band (or first portion of the tread band), defined as the portion disposed nearest to the outer edge of the tire facing away from the vehicle, is stiffer and has a tread pattern designed to resist cornering forces when the vehicle is turning. In this context, "stiffer" indicates a higher modulus of elasticity and "softer" a lower modulus of elasticity of the elastomeric compound. The outer tread band portion has an optimized tread pattern for providing traction on dry roads.

The portion of the tread band near the inner edge the tire facing the vehicle is the inner tread band (or second portion of the tread band), and is made of a softer compound with lower elasticity modulus than that of the outer tread band. The inner tread band portion has an optimized tread pattern for avoiding hydroplaning and for providing traction on wet roads.

Figure 1:
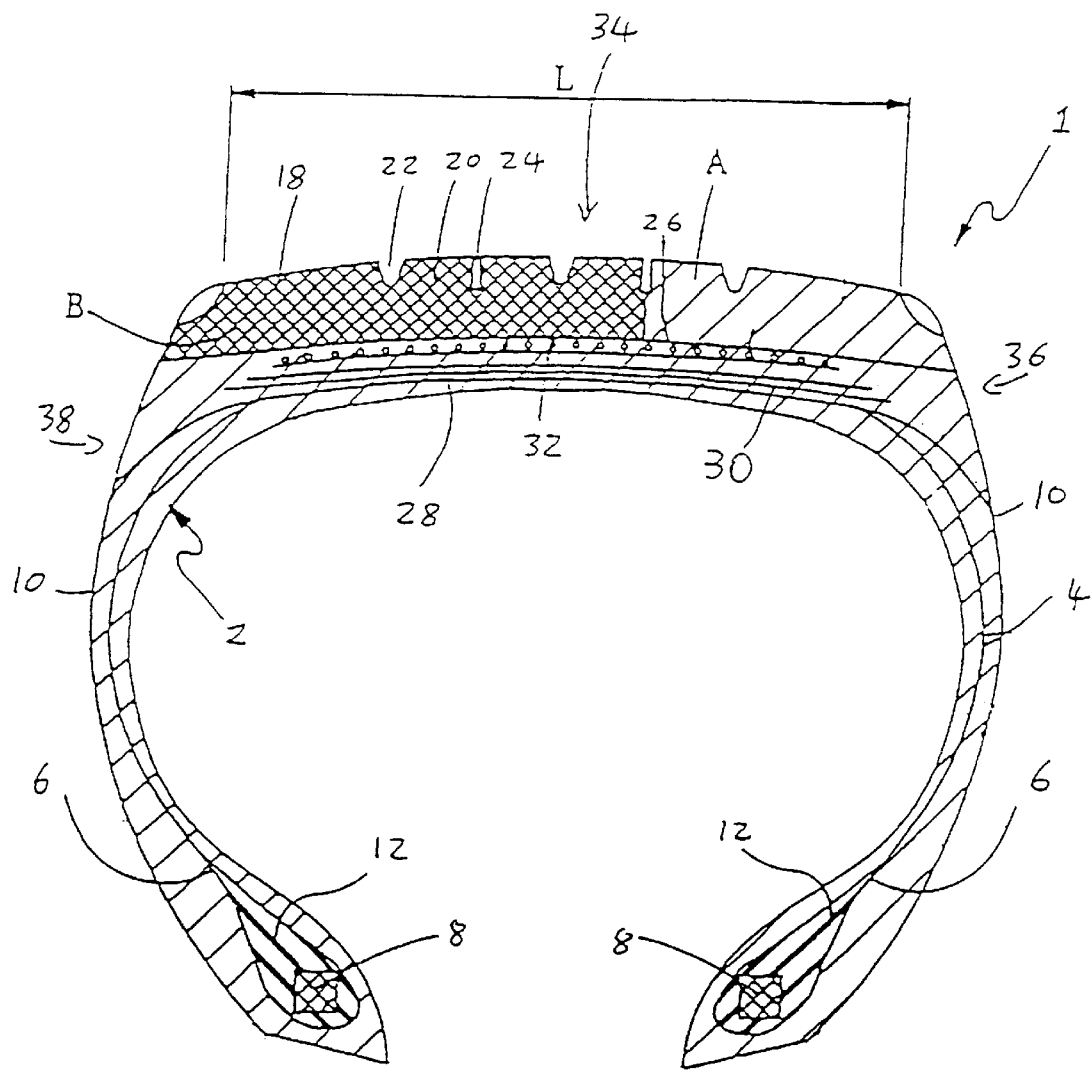
FIG. 1 is an axial cross section showing a tire for a vehicle according to one embodiment of this invention.

FIG. 1 is a cross-sectional view showing one embodiment of the tire according to this invention. Tire 1 comprises a carcass 2 having a reinforcing structure formed by at least one ply 4 of rubber-coated fabric, with reinforcing cords made of textile or metal thread or wire. This ply 4 is incorporated in the elastomeric compound of the fabric and has ends 6 each anchored to a bead core 8. Preferably, the ends 6 of the plies of the carcass wrap around the bead core 8 and return radially towards the tread band of the tire, along at least a part of the sidewall 10. Filler elements 12 made of rubber are placed between the ply 4 and its upturned end 6. The part of the tire comprising the bead core 8, the element 12, and the upturned end of the ply 6 form the bead of the tire which is used for anchoring the tire to the corresponding rim, not shown.

The carcass of the tire is preferably a radial type carcass, having reinforcing cords that lie in planes along the axis of rotation of the tire. A tread band 34 is provided circumferentially on the carcass, and forms the surface of the tire that is in contact with the ground. The width L of the tread band is defined by the distance between the points of intersection of the curvatures of the tread band 34 and of the sidewalls 10. A tread pattern is formed on the tread band, and comprises a plurality of blocks 18 and 20, separated from one another by corresponding notches and grooves 22, 24, which run both circumferentially and transversely across the tread band. In addition, these blocks may be provided with various slits and cuts. The combination of these structural elements in various configurations can generate many different tread patterns, which can be optimized for different applications of the tire.

Tire 1 also comprises a belt structure 26 arranged in the crown section of the carcass 2, interposed between the carcass 2 and the tread band 34, and extending from one sidewall of the tire to the other throughout substantially the entire width of the tread. The belt structure 26 comprises two radially superimposed layers 28 and 30 of reinforcing cords, preferably metallic. The reinforcing cords within each layer are parallel to one another, but cross the cords of the adjacent layer at an angle. Preferably, the belt structure 26 also comprises an additional layer 32 of reinforcing cords placed radially further away from the rotational axis of the tire than the layers 28 and 30, and preferably made of textile threads, or even more preferably of a heat shrinking material such as nylon, oriented in the circumferential direction.

Figure 2:
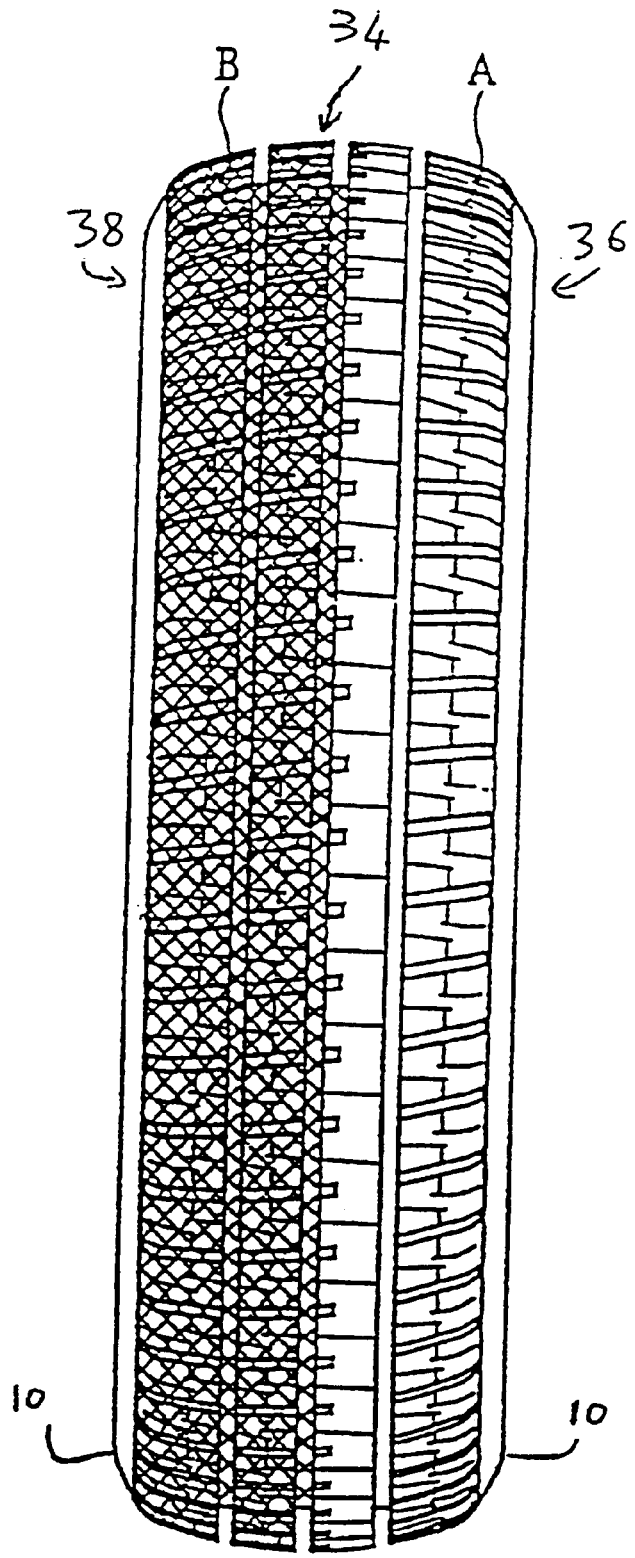
FIG. 2 is a front view showing a tire according to one embodiment of this invention, having an asymmetrical type tread pattern.

The tread band 34 of tire 1 has two circumferential portions A and B which are disposed adjacent to each other as shown in FIG. 1 and FIG. 2. A first portion A of the tread band is disposed adjacent to the outer face 36 of the tire, and is formed of an elastomeric compound having a first modulus of elasticity. This modulus of elasticity is high, and can be obtained in several way, well known to person skilled in the art, adding specific element into the compound, for example, by using a filler of carbon black or varying the amount of the several type of rubber in the compound. The actual composition of the elastomeric compound forming the first tread band portion can vary, as long as the desired first modulus of elasticity is obtained.

The first portion A of the tread band is provided with a first tread pattern as shown in FIG. 2. In a preferred embodiment, this first tread pattern can be optimized to provide good cornering performance and good handling characteristics of the tire in dry conditions. This is done by providing a first tread pattern having a reduced number of grooves and notches, so that more of the elastomeric compound is in frictional contact with the pavement during normal operations. The amount of elastomeric compound contacting the ground can be described, as explained above, as the net to gross ratio of the tread band. Thus, a greater net to gross ratio indicates that more elastomeric compound is in contact with the pavement, which results in better handling characteristics in dry conditions for the tire, and in reduced wear of a well designed tire.

The second portion B of the tread band is formed of an elastomeric compound having a second modulus of elasticity different from the first modulus and in particular lower than the first. It can be obtained in several ways, well known to person skilled in the art, such as by adding specific rubber components into the compound, or by varying the amounts of the several types of rubber components in the elastomer or by adding silica to the compound itself.

To better take advantage of these properties, the second portion B is preferably disposed on an inner side of the tread band adjacent to the inner face 38 of the tire, which is the side facing the vehicle when the tire is mounted on the vehicle.

The second portion B of the tread band also has a second tread pattern which is different from the first tread pattern, as shown in FIG. 2. The second tread pattern is optimized for providing good handling in wet conditions, and to resist hydroplaning of the tire. This is achieved by providing more grooves and notches so that a smaller surface area of elastomeric compound is in contact with the pavement in this portion of the tread band. In other words, the tread pattern of this portion of the tread band has a lower net to gross ratio than the tread pattern used on the first portion of the tread band. The more frequent and larger the grooves and notches, the greater is the room for water trapped between the tire and the pavement to escape. The tread pattern with a lower net to gross ratio prevents a layer of water from forming under the tire, so that the portions of the tread pattern forming the blocks can remain in contact with the pavement. In this manner, the tread pattern avoids hydroplaning of the tire from the pavement at high speeds.

For example the tread pattern shown in FIG. 2 is a Pirelli tire known under the trademark "P200 CHRONO ENERGY™", which has internal area with large grooves for water dispersal, robust central area for enhanced stability in straight and braking grip and external area with large shoulder blocks ensuring high cornering grip.

The tread pattern also has an effect on the stiffness of the tire. In general, the tire stiffness is a function of the tread pattern design and of the modulus of elasticity of the tread compound. The greater the net to gross ratio of the design, the stiffer the tire tends to become. As a result, in the tire according to the invention both the tread design and the composition of the tread compound result in a stiffer outer portion of the tire, and a less stiff inner portion. A synergy results between the effect of the different tread design and the tread compound modulus of elasticity in the two tread portions, so that the resulting stiffness characteristics of the tire provide a better ride and handling than what could be obtained by only varying the tread pattern or the tread compound modulus of elasticity across the tread band.

In one example of the tire according to the invention, a low modulus of elasticity compound is coupled with a less full tread design, resulting in a softer and less rigid tread band. This compound is used in the second portion B of the tread band to improve the overall comfort and smoothness of operation for the entire tire. At the same time, the tire has improved dry handling capabilities provided by the first portion A of the tread band, which has a greater net to gross ratio and higher modulus of elasticity compound.

The difference between the modulus of elasticity of the first and second portion of the tread band is preferably of at least 1 MPa, measured at 23° C. In a preferred embodiment of the invention, the first portion of the tread band A has a modulus of elasticity measured at 23° C. of between 12 MPa and 16 MPa, and the second portion of the tread band has a modulus of elasticity measured at 23° C. of between 7 MPa and 11 MPa.

In a most preferred embodiment according to the invention, the difference between the moduli of the two portions is of at least 3 MPa, measured at 23° C. In yet a more preferred embodiment of the invention, at 23° C. the modulus of elasticity of the first portion of the tread band is 14.3 MPa, and the modulus of elasticity of the second portion of the tread band is 9.3 MPa.

The actual values of the modulus of elasticity for the elastomeric compound of the first and second portions of the tread band can be adjusted to match specific applications of the tire, for example, tires for sports cars, or tires designed for operation in wet or muddy conditions, as long as the difference between the two values is maintained within a preferred range.

In a preferred embodiment of the invention, the width of the first portion of the tread band and the width of the second portion of the tread band are sized to achieve the desired balance of improved handling performance and of improved comfort and smoothness of operation. As shown in FIG. 2, the first portion A of the tread band disposed adjacent to the outer surface 36 of the tire occupies approximately 50% of the total width of the tread band. In general, the desired synergy between the two portions of tread band is obtained when the width of the second portion of the tread band is between 25 and 80 percent of the total width of the tread band, with the remaining tread band being occupied by the first portion of the tread band. In a more preferred embodiment, the second portion of the tread band occupies between 50 and 80 percent of the total tread band width. Other percentage splits between first and second tread portions can be used in diverse applications to optimize handling and comfort. In all embodiments, the sidewalls of the tire are formed of an elastomeric compound different from that of the tread band, and are not part of the first portion or the second portion of the tread band.

In one preferred embodiment of the invention, the tread band had an outer and an inner portion. The outer portion was formed of compound A, and the inner portion of compound B. The composition of the compounds A and B is set forth in Table 1.

TABLE 1

| | Units | Comp. A - Hard Outer portion | Comp. B - Soft Inner portion |
|---|---|---|---|
| Styrene Butadiene Rubber SBR 1712 | Phr | 137.5 | 86.5 |
| Natural Rubber NR | Phr | | 25 |
| Butadiene Rubber BR | Phr | | 12 |
| Carbon black N234 | Phr | 85 | 86 |
| Plasticizer | Phr | 5 | 22 |
| Antiox | Phr | 3 | 3 |
| Curing agent | Phr | 2.2 | 1.25 |
| Accelerating DPG | Phr | | 0.3 |
| Sulphur | Phr | 1.5 | 1.6 |

The measured properties of the compounds A and B are described in Table 2. In Table 2, the modulus of elasticity E' (measuring the energy retained and recovered during a cyclic deformation) and the loss factor "tan δ" (tan δ=E"/E', where E"=loss modulus which is measuring the heat-dissipated energy during a cyclic deformation), were measured on a cylindrical test piece of 14 mm diameter and 25 mm length. The test was conducted at 70° C., with a sinusoidal deformation frequency of 100 Hz, on a 25% pre-compressed test piece submitted to a further 3.5% deformation relative to the undeformed test piece. Prior to testing, the test piece was submitted to a conventional conditioning cycle to stabilize the data of subsequent measurements. For example, the test piece could be obtained from a portion of the tread band.

TABLE 2

| | Units | Comp. A - Hard Outer portion | Comp. B - Soft Inner portion |
|---|---|---|---|
| E' 23° C. | MPa | 14.3 | 9.3 |
| E' 70° C. | MPa | 6.8 | 6 |
| Hardness | IRHD | 78 | 71 |
| Tan δ at 23° C. | | 0.445 | 0.41 |
| Tan δ at 70° C. | | 0.335 | 0.3 |

Additionally, the tire of FIG. 2, according to this invention, has been compared with tires having the same tread pattern and different compounds in some driving tests on the road. Such comparison tires have the tread pattern of the tire available from Pirelli under the trademark "P200 CHRONO ENERGY™". The results are shown in Table 3.

TABLE 3

| | Outer portion Comp. A (Hard) - Inner portion Comp. B (Soft) | Outer and inner portion Comp. A (Hard) | Outer and inner portion Comp. B (Soft) |
|---|---|---|---|
| SOFT HANDLING | | | |
| Progressivity | 6 | 5 | 5.5 |
| Lane change | 6 | 5.5 | 5 |
| COMFORT | | | |
| Impact | 7 | 5.5 | 7 |
| Dumping | 7 | 6 | 5.5 |

The marks, on a scale of from 1 to 10, reflect the opinion of the test driver. As higher is the mark, the better is the result.

The table shows that the performance of the tire of the invention is substantially better than the others tires of the tests. In this embodiment, the different values of the modulus of elasticity for the different side of the tread band are mainly achieved by changing the amount of the different type of rubbers used in the compound. It is well known to the skilled person in the art to obtain different values of modulus of elasticity by using appropriate type and/or quantity of the components making the compound.

In another embodiment according to the invention, the tread band for a tire could be formed in three portions. The three portions include two shoulder portions, located at the edges of the tread band, adjacent to the sidewalls of the tire, and a center portion, disposed in the axial center of the tread band. The three tread band portions are preferably in the shape of circumferential bands. The center tread band portion is formed of an elastomeric compound having a low modulus of elasticity and having a less full tread pattern design. The two shoulder portions are made of a compound having greater modulus of elasticity and have a more full tread pattern design. This embodiment could be used for automobile or motorcycle tires, and would provide handling and comfort benefits.

It will be apparent to those skilled in the art that there are modifications and variations that can be made in the structure of the present invention, without departing from the spirit or scope of the invention. Thus, it is intended that the present invention covers the modifications and variations of this invention provided they come within the scope of the appended claims and their equivalents.

What is claimed is:

1. A tread band for a vehicle tire, comprising:
an asymmetrical design;
a first portion of a first elastomeric compound; and
a second portion of a second elastomeric compound;
wherein the first portion comprises a first tread pattern,
wherein the first portion further comprises a first dynamic modulus of elasticity,
wherein the second portion comprises a second tread pattern,
wherein the second portion further comprises a second dynamic modulus of elasticity,
wherein the first tread pattern is different from the second tread pattern,
wherein the first tread pattern comprises a greater net-to-gross ratio than the second tread pattern,
wherein the first dynamic modulus of elasticity is different from the second dynamic modulus of elasticity, and
wherein the first dynamic modulus of elasticity, measured at 23° C., is at least 1 MPa greater than the second dynamic modulus of elasticity, measured at 23° C.

2. A tire for a vehicle, comprising:
a radial carcass;
a tread band disposed radially outward of the carcass; and
a belt structure interposed between the carcass and the tread band;
wherein the tread band comprises:
an asymmetrical design;
a first portion of a first elastomeric compound; and
a second portion of a second elastomeric compound;
wherein the first portion comprises a first tread pattern,
wherein the first portion further comprises a first dynamic modulus of elasticity,
wherein the second portion comprises a second tread pattern,
wherein the second portion further comprises a second dynamic modulus of elasticity,
wherein the first tread pattern is different from the second tread pattern,
wherein the first tread pattern comprises a greater net-to-gross ratio than the second tread pattern,
wherein the first dynamic modulus of elasticity is different from the second dynamic modulus of elasticity,
wherein the first dynamic modulus of elasticity, measured at 23° C., is greater than or equal to about 12 MPa and less than or equal to about 16 MPa, and
wherein the second dynamic modulus of elasticity, measured at 23° C., is greater than or equal to about 7 MPa and less than or equal to about 11 MPa.

3. The tire of claim 2, wherein the first and second portions are separated along a plane perpendicular to a rotation axis of the tire.

4. The tire of claim 2, wherein the first portion comprises a constant axial width.

5. The tire of claim 2, wherein the second portion comprises a constant axial width.

6. The tire of claim 2, wherein the first portion comprises a same axial width as the second portion.

7. The tire of claim 2, wherein a width of the second portion is greater than or equal to 25% and less than or equal to 80% of a combined width of the first and second portions.

8. The tire of claim 2, wherein a width of the second portion is greater than or equal to 50% and less than or equal to 80% of a combined width of the first and second portions.

9. The tire of claim 2, wherein the first dynamic modulus of elasticity, measured at 23° C., is at least 1 MPa greater than the second dynamic modulus of elasticity, measured at 23° C.

10. The tire of claim 2, wherein the first dynamic modulus of elasticity, measured at 23° C., is at least 3 MPa greater than the second dynamic modulus of elasticity, measured at 23° C.

11. A tire for a vehicle, comprising:
a radial carcass;
a tread band disposed radially outward of the carcass; and
a belt structure interposed between the carcass and the tread band;
wherein the tread band comprises:
an asymmetrical design;
a first portion of a first elastomeric compound; and
a second portion of a second elastomeric compound;
wherein the first portion comprises a first tread pattern,
wherein the first portion further comprises a first dynamic modulus of elasticity,
wherein the second portion comprises a second tread pattern,
wherein the second portion further comprises a second dynamic modulus of elasticity,
wherein the first portion comprises a smaller number of grooves and notches than the second portion,
wherein the first tread pattern is different from the second tread pattern,
wherein the first dynamic modulus of elasticity is different from the second dynamic modulus of elasticity,
wherein the first dynamic modulus of elasticity, measured at 23° C., is greater than or equal to about 12 MPa and less than or equal to about 16 MPa, and
wherein the second dynamic modulus of elasticity, measured at 23° C., is greater than or equal to about 7 MPa and less than or equal to about 11 MPa.

12. A tread band for a vehicle tire, comprising:
an asymmetrical design;
a first portion of a first elastomeric compound; and
a second portion of a second elastomeric compound;
wherein the first portion comprises a first tread pattern,
wherein the first portion further comprises a first dynamic modulus of elasticity,
wherein the second portion comprises a second tread pattern,
wherein the second portion further comprises a second dynamic modulus of elasticity,
wherein the first tread pattern is different from the second tread pattern,
wherein the first tread pattern comprises a greater net-to-gross ratio than the second tread pattern,
wherein the first dynamic modulus of elasticity is different from the second dynamic modulus of elasticity,
wherein the first dynamic modulus of elasticity, measured at 23° C., is greater than or equal to about 12 MPa and less than or equal to about 16 MPa, and
wherein the second dynamic modulus of elasticity, measured at 23° C., is greater than or equal to about 7 MPa and less than or equal to about 11 MPa.

13. The tread band of claim 1 wherein the first dynamic modulus of elasticity, measured at 23° C., is at least 3 MPa greater than the second dynamic modulus of elasticity, measured at 23° C.

14. A method for making an asymmetrical tread band for a vehicle tire, comprising:
providing a tread band comprising a first portion and a second portion; forming a first tread pattern on the first portion; and forming a second tread pattern on the second portion to thereby make an asymmetrical tread band;
wherein the first portion comprises a first dynamic modulus of elasticity,
wherein the second portion comprises a second dynamic modulus of elasticity,
wherein the first tread pattern is different from the second tread pattern,
wherein the first tread pattern comprises a greater net-to-gross ratio than the second tread pattern,
wherein the first dynamic modulus of elasticity is different from the second dynamic modulus of elasticity,
wherein the first dynamic modulus of elasticity, measured at 23° C., is at least 1 MPa greater than the second dynamic modulus of elasticity, measured at 23° C.,
wherein a width of the second portion is greater than or equal to 25% and less than or equal to 80% of a combined width of the first and second portions, and
wherein, when the tread band is disposed radially outward of a radial carcass of the tire, the first portion is disposed on a side of the tire adapted for facing away from a centerline of the vehicle and the second portion is disposed on a side of the tire adapted for facing toward a centerline of the vehicle.

15. A wheel for a vehicle, comprising:
a rim; and
a tire mounted on the rim;
wherein the tire comprises:
a radial carcass;
sidewalls extending along edges of the carcass;
a tread band disposed radially outward of the carcass; and
a belt structure interposed between the carcass and the tread band;
wherein the tread band comprises:
an asymmetrical design;
a first portion of a first elastomeric compound; and
a second portion of a second elastomeric compound;
wherein the first portion comprises a first tread pattern,
wherein the first portion further comprises a first dynamic modulus of elasticity,
wherein the second portion comprises a second tread pattern,
wherein the second portion further comprises a second dynamic modulus of elasticity,
wherein the first tread pattern is different from the second tread pattern,
wherein the first tread pattern comprises a greater net-to-gross ratio than the second tread pattern,
wherein the first dynamic modulus of elasticity is different from the second dynamic modulus of elasticity,
wherein the first dynamic modulus of elasticity, measured at 23° C., is greater than or equal to about 12 MPa and less than or equal to about 16 MPa, and
wherein the second dynamic modulus of elasticity, measured at 23° C., is greater than or equal to about 7 MPa and less than or equal to about 11 MPa.

* * * * *